UNITED STATES PATENT OFFICE.

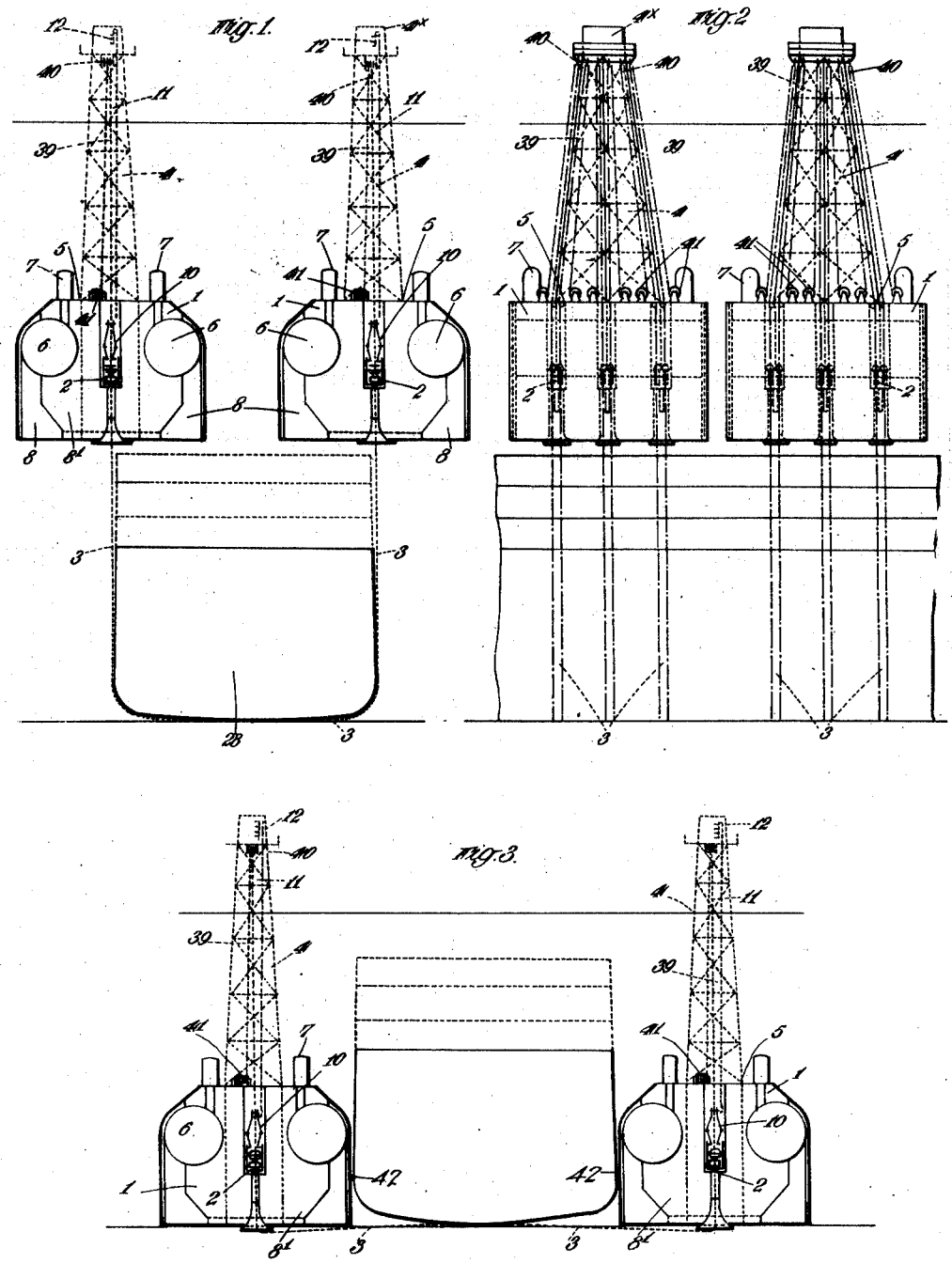

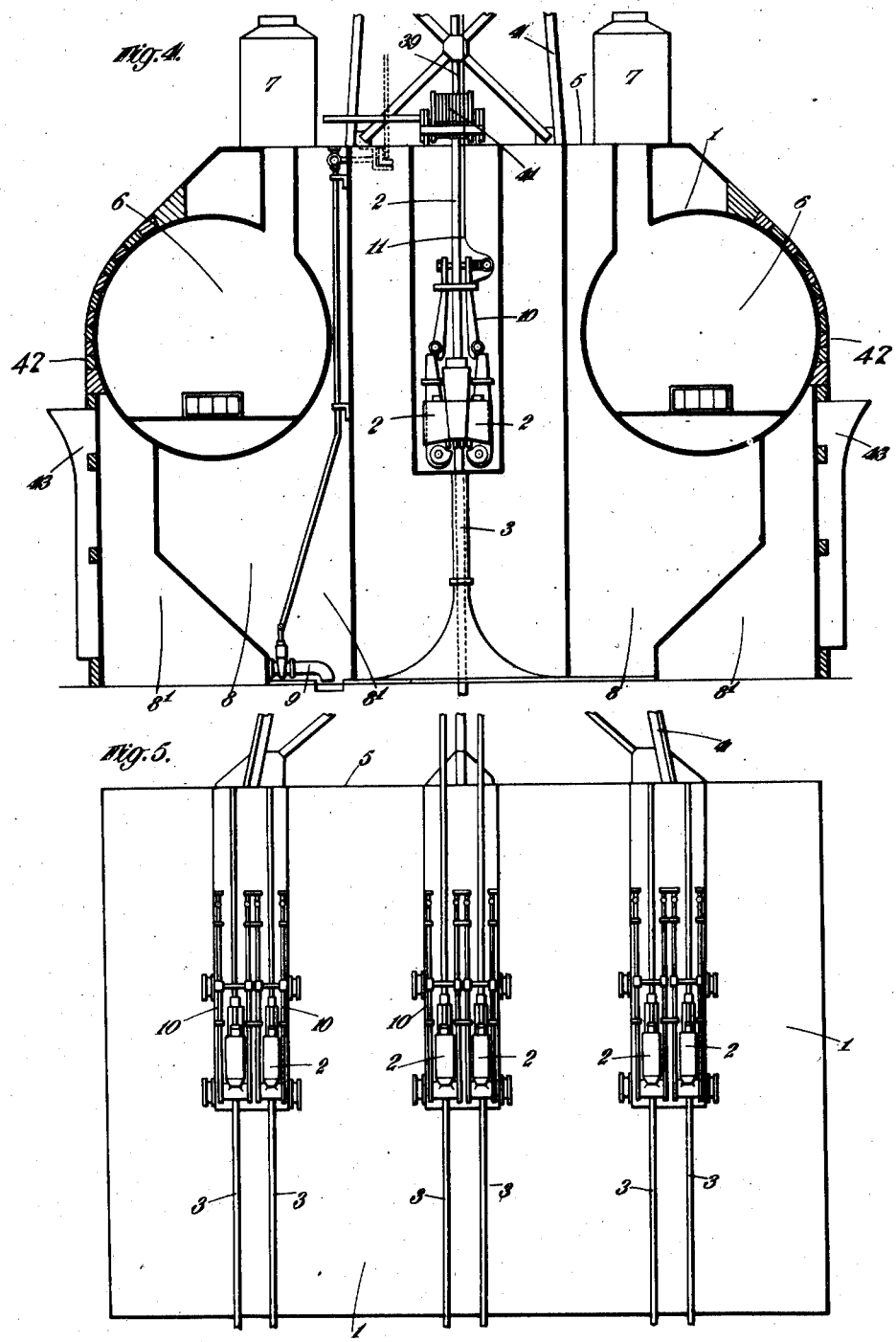

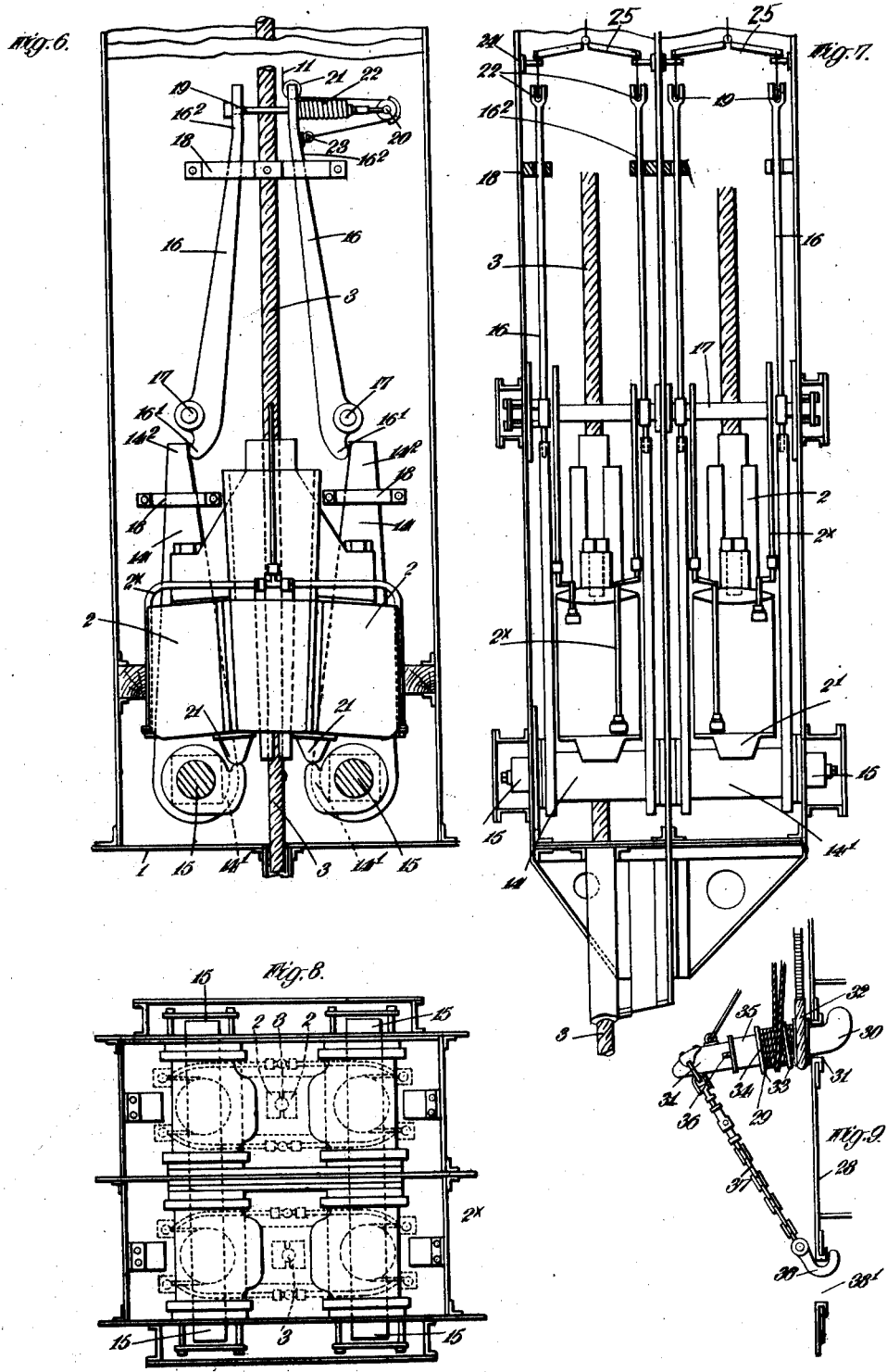

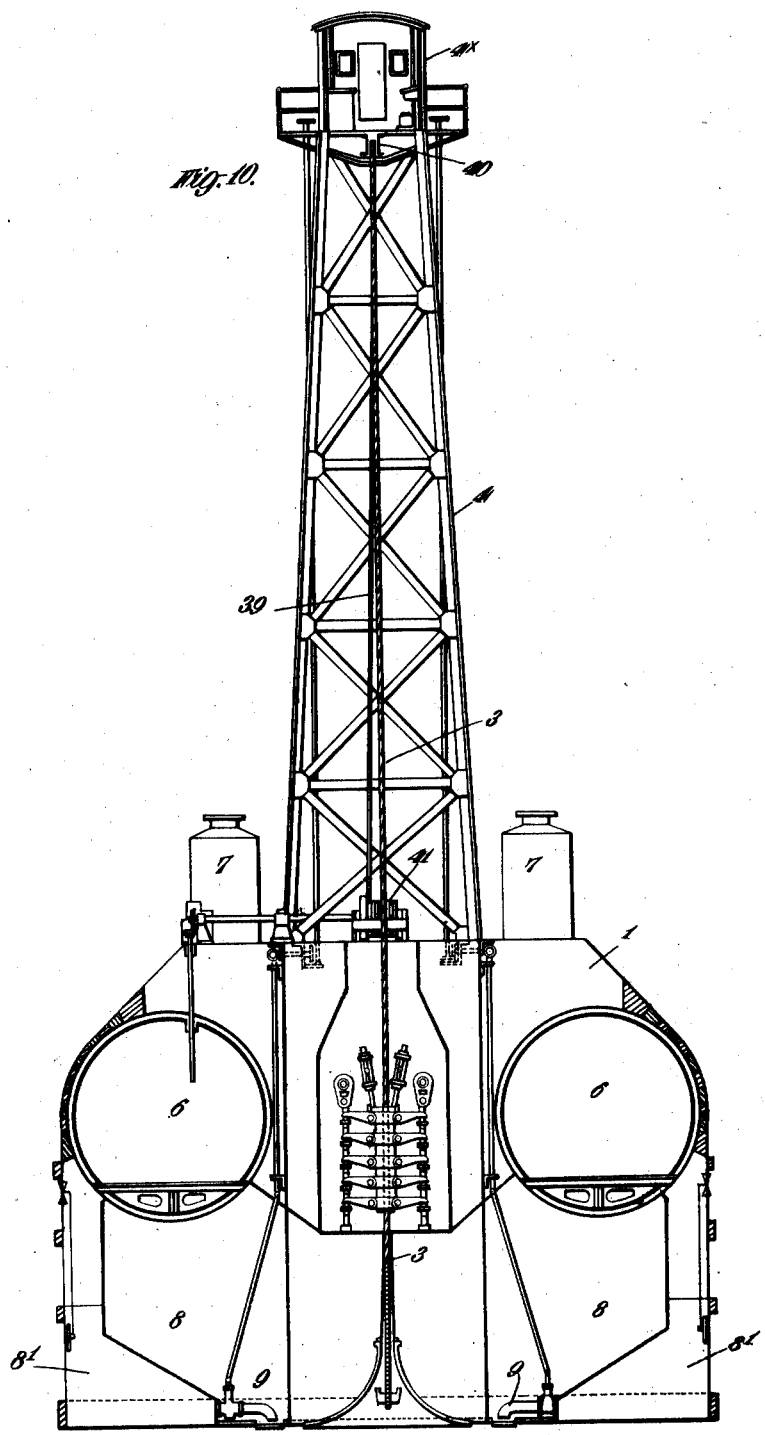

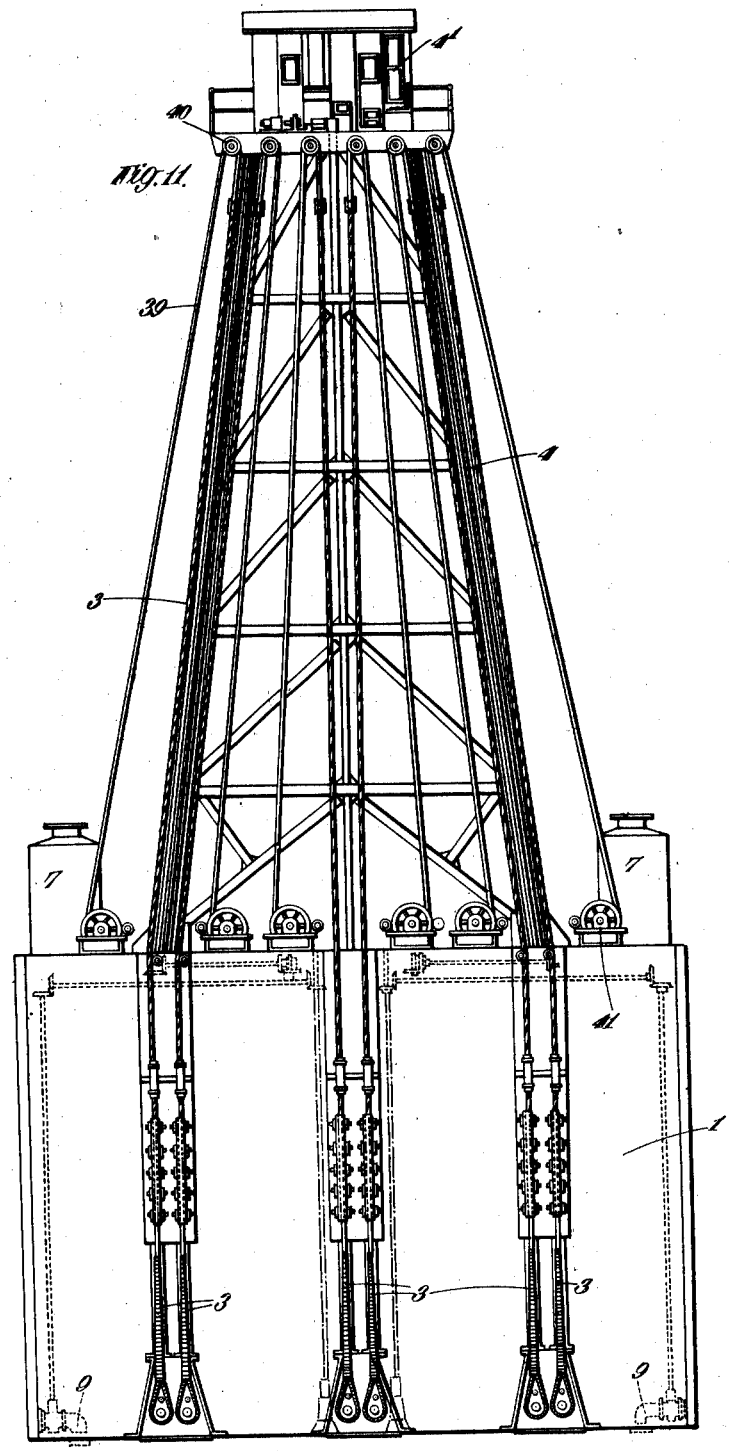

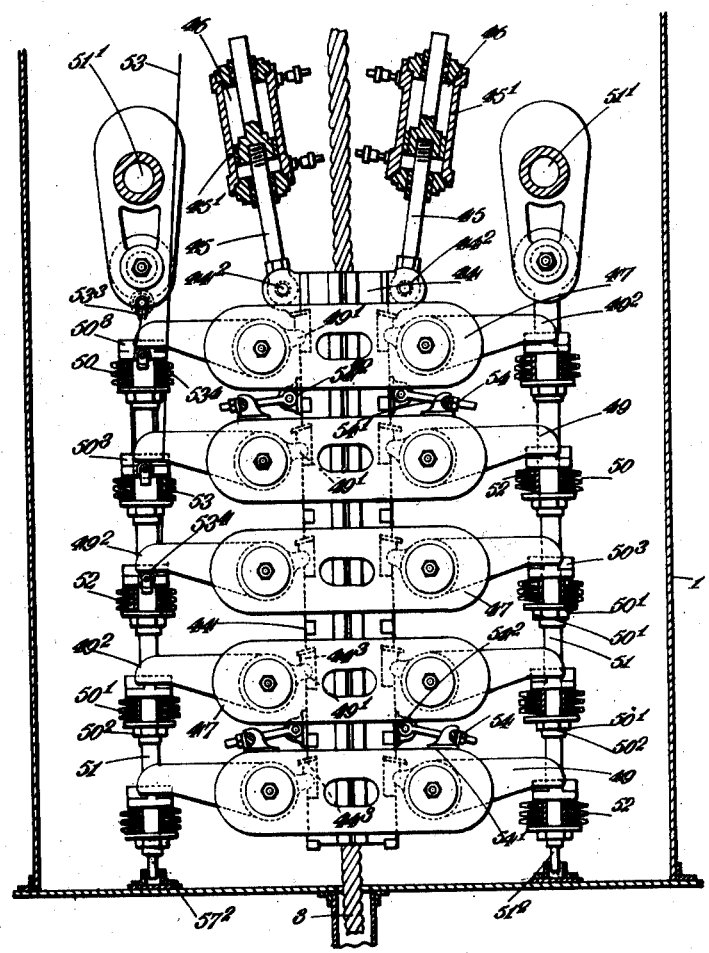

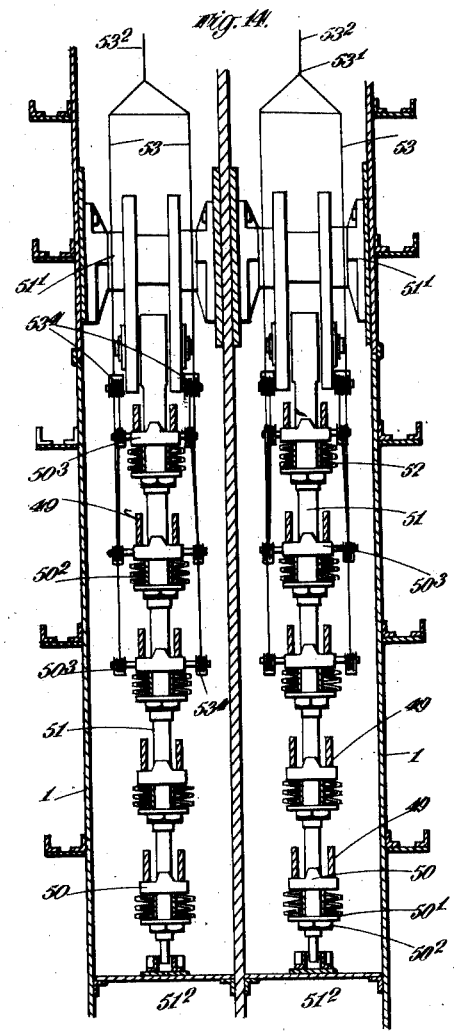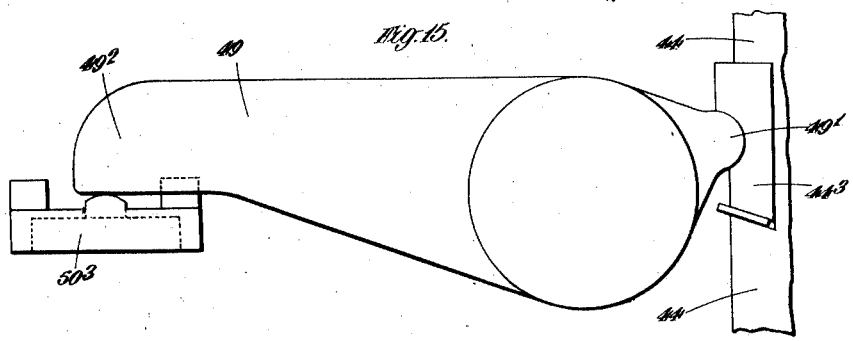

THOMAS GEORGE OWENS THURSTON AND ALFRED HILEY, OF WESTMINSTER, LONDON, ENGLAND, ASSIGNORS, BY MESNE ASSIGNMENTS, TO VICKERS PONTOONS LIMITED, OF WESTMINSTER, LONDON, ENGLAND.

PONTOON FOR RAISING SUNKEN VESSELS.

1,341,289.  Specification of Letters Patent.  Patented May 25, 1920.

Application filed February 7, 1918. Serial No. 215,945.

*To all whom it may concern:*

Be it known that we, THOMAS GEORGE OWENS THURSTON and ALFRED HILEY, both subjects of the King of Great Britain, residing at Vickers House, Broadway, Westminster, in the county of London, England, have invented certain new and useful Improvements in or Relating to Pontoons for Raising Sunken Vessels, of which the following is a specification.

This invention relates to the raising of sunken vessels by means of submersible pontoons which have a variable buoyancy and which after being flooded are adapted to be drawn down toward the sunken vessel, against a reserve of buoyancy, by means of winches which haul on lifting cables attached to or passed beneath the said vessel, the water with which the said pontoons are flooded being subsequently pumped or blown out to enable the pontoons to exert their lifting power upon the sunken vessel through the lifting cables. With pontoons of this kind it is usual to employ only one or two lifting cables for each pontoon or pair of pontoons, owing to the fact that when more than two lifting cables are employed there is a tendency for the load to become unevenly distributed between the lifting cables, with the liability of one or other of the cables breaking under excessive load.

According to our invention two or more lifting cables are employed for each pontoon together with a device for indicating the tension exerted by the sunken vessel on the respective lifting cables, means being also provided for slipping or relieving from tension any lifting cable which is being subjected during the buoyancy lift to more than its due proportion of the load. In order to indicate during the buoyancy lift the disposition and position of the vessel we may also provide each pontoon with a superstructure so that its position when immersed can be readily determined and we provide the said superstructure with a control station for regulating the various operations of the pontoons, said control stations being always maintained above the water irrespective of the depth to which the pontoons are submerged.

The said tension indicating device is preferably of such a character that it will serve to support each cable and can be utilized to indicate to the operators within the control stations the degree of tension by acting after the manner of a measuring or weighing device. Such device coöperates with a controllable stop or gripper for each of the lifting cables, said stop or gripper being preferably of the hydraulic type or of such a character that it can be actuated from the pontoon control station so as to slip the cable or relieve it of its tension to the desired extent according to the indications of the tension indicating devices.

In order that the said invention may be clearly understood and readily carried into effect the same will now be described more fully with reference to the accompanying drawings which show one constructional embodiment of the invention and in which:

Figures 1, 2 and 3 are diagrammatic views showing successive positions assumed by the pontoons during the lifting of a sunken vessel.

Figs. 4 and 5 are partly diagrammatic sectional views taken at right angles to one another and showing the general arrangement of the grippers within the pontoons.

Figs. 6 and 7 are sectional views of the grippers on a larger scale taken at right angles to one another.

Fig. 8 is a plan view of Fig. 6.

Fig. 9 is a detail view of a bolt or fitting hereinafter more fully referred to.

Figs. 10 and 11 are partly diagrammatic sectional views taken at right angles to one another showing a modified construction of gripping means for the lifting cables.

Figs. 12, 13 and 14 are respectively a sectional elevation, a plan, and an end view on an enlarged scale of the gripping means shown at Figs. 10 and 11.

Fig. 15 is a detail.

In the form shown in Figs. 1–8, 1, 1 are the pontoons, 2, 2 are the grippers for the lifting cables 3, 3. 4 is the superstructure carried on the deck 5 of each pontoon and provided at its upper part with the control station $4^x$. The grippers 2, 2 are of the well known hydraulically controlled type and comprise a pair of inclined or wedge-shaped longitudinally movable members between which the cable passes. When the said members are caused to approach one another by hydraulic power conveyed by pipes $2^x$, they come into contact with and firmly grip the cable and when the said members are moved in the opposite direction, the grip on the cable is released and the latter permitted to slip. The movement of the said members is controlled by an operator in the control station of each pontoon, who is thus able by causing the wedge shape members to move in one direction or the other to slip any of the cables 3, 3 to the desired extent according to requirements. Associated with each pair of grippers is the aforesaid measuring or weighing device 10 (Figs. 1 to 3). The said device 10 is in the form of a system of reducing levers connected by means of a tension wire 11 to a gage or indicator 12 located in the control station $4^x$ at the top of the superstructure 4. The said reducing levers comprise two pairs of vertically disposed cranked levers 14 having unequal arms and pivotally connected at 15 to the pontoon; they are disposed on opposite sides of and serve as supports for the gripping means 2, the latter for that purpose being provided with a pair of bearing lugs $2'$ which rest upon the short lever arm $14'$, the arrangement being such that when the load is on the lifting cable 3, the upper ends $14^2$ of the levers 14 tend to turn inward toward each other. Near the upper extremities of the said levers 14 are arranged two pairs of levers 16 having unequal arms and pivotally connected at 17 to the pontoon the long arm $14^2$ of the said levers 14 bearing against the short arms $16'$ of the levers 16 and tending to turn the long arms $16^2$ thereof outward away from the lifting cable 3. The range of movement of the levers 14 and 16 is limited by flanged plates 18 secured to the pontoon. The levers 16 are connected together in pairs by bolts 19 and are movable relatively to each other against the influence of a spring 22. The tension wire 11 passes over sheaves 20 and 21 carried respectively by the bolts 19 and one of the levers 16. One part (i. e. the lower part) of the wire 11 is connected at 23 to the same lever 16 and after passing through a guide 24 connected to the casing of the pontoon is attached to one end of a member 25, to the other end of which the lower part of the tension wire 11 from the contiguous pair of levers 16 is connected. The other part of the tension wire 11 is connected to the middle of the member 25 and to the gage or indicator 12 in the control station $4^x$. A separate gage or indicator 12 is provided for each of the lifting cables and all of said gages or indicators are preferably brought together in a casing having a glazed opening through which their relative positions can be seen by the operator in the control station. It will be obvious that by comparing the relative position of the indications during the lifting of a sunken vessel the operator is kept constantly informed of the tension to which the respective cables belonging to that particular pontoon are being subjected; by loosening one or other of the grippers where necessary so as to slip their cables, he is able to distribute the load evenly, and keep it evenly distributed by having regard to the relative position of the gages or indicators.

The super-structure 4 is of considerable height (say 60 feet) and built up of light structural steelwork attached to the deck 5 of the pontoon. The control station $4^x$ being at the upper part of the super-structure 4 remains above the sea level at whatever depth the pontoon is submerged and contains, in addition to the gages 12, all the various devices necessary for controlling the operations of the pontoon, thus rendering it possible to control the same therefrom at all times whether the pontoon is submerged or at the surface. The extent to which the several super-structures 4 project above the water also serves to indicate the depth of immersion of the respective pontoons prior to or during the buoyancy lift, while the inclination to the vertical of the said superstructures during the buoyancy lift will also indicate the disposition of the load on the lifting cables.

In the modified arrangement shown in Figs. 10 to 15 the gripping means for each cable comprise vertical gripping members 44, having grooved faces $44'$ located on each side of the lifting cable 3, the said members being connected at $44^2$ to the piston rods 45 of a pair of hydraulic rams 46. Located on each side of the gripping members 44 and superimposed above one another are a series of metal tie plates 47 which are connected together in pairs by bolts 48. Pivotally mounted between the tie plates 47 and located on both sides of the gripping members 44 are pairs of compression levers 49 (one of which is shown on an enlarged scale at Fig. 15), having arms of unequal length, the short arm $49'$ of each compression lever 49 engaging within a hard tool steel bearing $44^3$ in the gripping members 44, and the long lever arm $49^2$ resting upon a resilient support 50 mounted upon uprights 51, which latter are connected at $51'$ and $51^2$ to a rigid part of the body of the pontoon. Each resilient support comprises a part $50'$ which is rigidly connected to the upright 51 by a nut $50^2$ and a part $50^3$ which is slidably mounted upon the upright 51 and upon which the long lever arms $49^2$ are adapted to rest, Belleville compression springs 52 being located between the fixed and movable parts $50^2$ and $50^3$.

In order to cause the gripping members 44 to grip the cable 3, the hydraulic rams 46 are operated from the control station so that the pistons 45′ move downward within their respective cylinders thereby moving the said members 44 in a downwardly direction. Owing to the fact that the short arms 49′ of the compression levers 49 are in engagement with the said members 44 and are themselves prevented from moving outward by the tie plates 47, the gripping members 44 are wedged inward toward one another and compress the cable 3. When the load comes on to the cable 3 it is therefore transferred through the compression levers 49 to the springs 52 which serve evenly to distribute it to the uprights 51. The degree of compression to which the springs 52 are subjected is measured by pairs of tension wires 53 connected as shown at 53′ (Fig. 14) to a common tension indicating wire $53^2$ which communicates with a gage or indicator in the control station. The movement of the springs 52 is magnified by connecting the lower end $53^3$ of each gage wire 53 to an immovable part of the structure after the wire has been passed around a system of pulleys $53^4$ as shown at Figs. 12 and 14. The movement of each gage wire 53 is thus proportional to the compression of the springs 52 and is indicated on the gage or indicator in the control station as explained before and interpreted as the corresponding amount of load taken by the cable.

It will be observed that the load, during the buoyancy lift, is entirely supported by the uprights 51 which receive it from the compression levers 49, through the resilient supports 50, while the downward pull due to the load on the cables 3 is itself utilized to create the force which causes the levers 49 to wedge the gripping members 44 toward one another and so increase their grip upon the cable. The hydraulic pressure above the pistons of the rams 46 can therefore be cut off immediately the load is on the cables 3.

When it is desired to relieve any cable of a portion of its load owing to the fact that the gage in the control station indicates that that particular cable is being subjected to undue strain, the gripping members 44 are gradually released until the cable 3 commences to slip through the said gripping members. To this end hydraulic pressure is admitted to the under faces of the pistons 45′ so that they commence to move in an upwardly direction taking with them the gripping members 44 and thereby relieving the levers 49 of a portion of the downward pull due to the load which causes them to wedge the said members 44 together and so to compress the cable. When the frictional hold which the members 44 exert upon the cable becomes less than the load taken by the said cable the latter will commence to slide through the said members. After the excess load taken up by the said cable has been evenly distributed throughout the other cables the pressure is removed from the under faces of the pistons 45′ and the load is again taken up by the uprights 51.

Tie bolts 54 may be provided which are attached at 54′ to the upper and lower tie plates 47 and pivotally connected at $54^2$ to the gripping members 44.

When no load is on the lifting cables 3, and it is required to cause them to travel freely through the grooves 44′ of the gripping members 44, pressure is again admitted to the under faces of the pistons 45′. On account of the tie bolts 54 the members 44 are pulled backward away from one another and at the same time are slightly raised, thereby freeing the cable.

The pontoons 1, 1 each consists of a box-shaped tank with permanently buoyant spaces 6, 6 and 7, 7 and also floodable spaces 8, 8 controlled by valves 9. These pontoons are, in the example shown, adapted to work in pairs on opposite sides of the vessel 28 to be raised. The said pontoons are connected together by the lifting cables 3, 3 (Figs. 1 to 3) which either extend beneath the sunken vessel or are attached to the port holes or sidelights of the vessel by means of a special bolt or fitting 29, (Fig. 9). Such bolt or fitting 29 comprises a part formed with a head 30 which passes through one of the port holes 30′ and a shank 31, which, when the bolt 29 is in position, projects laterally from the vessel's side, a thimble 32 at the end of the lifting cable 3 being adapted to be passed over the bolt and maintained resiliently in position by means of a pair of washers 33 held apart by a spring 34 composed of hemp rope, so as to allow of slight play of the thimble 32 during the lifting movements. The said washers are held in place by means of a sleeve 35 passed over the shank of the bolt and locked in position by a cotter pin 36. To the extreme end of the shank of the bolt a pair of depending chains 37 are attached, the lower ends of the said chains being spread apart and attached by means of hooks 38 to sidelights or port holes 38′ disposed on the deck below that to which the bolt is attached.

Each pontoon 1, 1, is provided with three pairs of lifting cables 3, 3 which are adapted to be hauled upward and made fast to the grippers 2, 2 prior to the lifting operation, by means of lighter cables 39 which pass around pulleys 40 at the top of the superstructure 4 and which are hauled by winches 41 located on the deck of the pontoon and controlled from the control station $4^x$. The buoyant chambers 7, 7 are in the form of cylinders projecting beyond the deck of the pontoon and affording a reserve of buoyancy when the floodable spaces 8, 8 are filled with water, so that the pontoon does not sink until it is drawn down to the wreck by the winches 41. The valves 9 for controlling the ingress and egress of water from the floodable spaces 8, 8 instead of communicating directly with the surrounding water, communicate with secondary chambers 8', 8' which are themselves open to the sea. These secondary chambers also serve to strengthen the pontoon and may be reinforced in any desired manner. The side walls 42 of the pontoons when in the position shown in Fig. 3 are adapted to bear against the side of the vessel 28 and may be provided with gripping devices 43 which serve to hold the pontoon in position.

In operation, the required number of pontoons 1, 1, which are adapted to work in pairs on opposite sides of the sunken vessel, are brought into position above the wreck. The lifting cables 3, 3, in cases where they serve to connect each pair of pontoons together are then passed under the wreck, or according to the arrangement which is described with reference to Fig. 9 the cables from each pair of pontoons are connected to port holes or side lights on opposite sides of the vessel. The floodable spaces 8, 8 having been filled with water the pontoons are drawn down toward the sunken vessel, against the reserve or buoyancy provided by the buoyant chambers in the pontoon, by means of the lifting cables 1, 1, which are drawn upward by means of the lighter cables 39 which pass around pulleys 40 at the top of the superstructure, said cables 39 being hauled upon by the winches 11 located on the deck of the pontoon. The lifting cables 1, 1, having been drawn upward to the required extent they are made fast to the grippers 2, 2, and the water with which the pontoons were flooded is thereafter pumped or blown out so that the pontoons exert their lifting power upon the sunken vessel. Owing to the fact that a separate gage or indicator is provided for each of the lifting cables the operator in the control station 4ˣ at the top of the superstructure 4 is kept constantly informed of the tension to which the respective cables belonging to that particular pontoon are being subjected and by loosening one or other of the grippers when necessary so as to slip any cable which is being subjected to undue tension, he is able to distribute the load and keep it evenly distributed by having regard to the relative position of the respective gages or indicators.

Figs. 1 and 2 show the approximate position of the pontoons prior to the buoyancy lift when raising a vessel which is sunk in deep water.

Fig. 3 shows the position of the pontoons during a succeeding lift and after the vessel shown in Figs. 1 and 2 has been raised and moved into shallower water, the pontoons in that case being drawn down to the sides of the vessel 28 prior to the buoyancy lift.

What we claim and desire to secure by Letters Patent of the United States is:—

1. In apparatus for raising sunken vessels comprising submersible pontoons and lifting cables, the provision of means for indicating the tension exerted by the sunken vessel on the respective lifting cables of each pontoon, means for gripping and holding said lifting cables, and means coöperating with said gripping means for slipping or relieving from tension any cable which is being subjected during the buoyancy lift to more than its due proportion of the load.

2. Apparatus for raising sunken vessels by means of submersible pontoons comprising a multiplicity of submersible pontoons, a multiplicity of lifting cables, gripping means for said cables, tension indicating means, means associated with said gripping means for transmitting to said tension indicating means the tension exerted during the buoyancy lift on each lifting cable and means for actuating said gripping means so as to cause the same to grip or release the cables as desired.

3. In apparatus for raising sunken vessels comprising submersible pontoons and lifting cables the provision of means for indicating the tension exerted by the sunken vessel on the respective lifting cables of each pontoon, hydraulically controlled gripping means for gripping and holding said lifting cables, and means coöperating with said hydraulically controlled gripping means for slipping or relieving from tension any cable which is being subjected during the buoyancy lift to more than its due proportion of the load.

4. Apparatus for raising sunken vessels by means of submersible pontoons comprising a multiplicity of submersible pontoons having a variable buoyancy, a multiplicity of lifting cables, gripping devices for said cables, a pair of coöperating gripping devices being provided for each lifting cable, and means associated with said gripping devices which serve both to transmit the load from the gripping devices to the pontoons and also to cause the said devices to tighten their grip on the cables in proportion to the load thereon.

5. Apparatus for raising sunken vessels by means of submersible pontoons comprising a multiplicity of submersible pontoons having a variable buoyancy, a multiplicity of lifting cables, gripping devices for said cables, a pair of coöperatnig gripping devices being provided for each lifting cable, means associated with said gripping devices which serve both to transmit the load from the gripping members to the pontoons and also to cause the said devices to tighten their grip on the cables in proportion to the load thereon, tension indicating means, and means also associated with said gripping devices for transmitting to said tension indicating means the tension exerted during the buoyancy lift on each cable.

6. Apparatus for raising sunken vessels by means of submersible pontoons comprising a multiplicity of submersible pontoons having a variable buoyancy, a multiplicity of lifting cables, gripping devices for said cables, means associated with said gripping devices which serve both to transmit the load from the gripping members to the pontoons and also to cause the said devices to tighten their grip on the cables in proportion to the load thereon, tension indicating means, means also associated with said gripping devices for transmitting to said tension indicating means an indication of the tension exerted on each cable, and means coöperating with said gripping devices for slipping or relieving from tension any cable which is being subjected during the buoyancy lift to more than its due proportion of the load.

7. Apparatus for raising sunken vessels by means of submersible pontoons comprising a multiplicity of lifting cables, submersible pontoons having a variable buoyancy, means for flooding and drawing down toward the sunken vessel said submersible pontoons against a reserve of buoyancy, gripping devices acting on said lifting cables, means for actuating said gripping devices for effecting an initial grip on the lifting cables prior to the buoyancy lift, and means for actuating said members and relieving their frictional grip on the cables when it is desired to slip the same for the purposes specified.

8. Apparatus for raising sunken vessels by means of submersible pontoons comprising a multiplicity of lifting cables, submersible pontoons having a variable buoyancy, means for flooding and drawing down toward the sunken vessel said submersible pontoons against a reserve of buoyancy, gripping devices for acting on said lifting cables, means for actuating said gripping devices to effect an initial grip on the lifting cables prior to the buoyancy lift and hydraulically controlled means for actuating said devices and relieving their frictional grip on the cables when it is desired to slip the same.

9. Apparatus for raising sunken vessels by means of submersible pontoons comprising a multiplicity of lifting cables, submersible pontoons having a variable buoyancy, means for flooding and drawing down toward the sunken vessel said submersible pontoons against a reserve of buoyancy, gripping devices for acting on said lifting cables, hydraulically controlled means for actuating said gripping devices to effect an initial grip between said gripping devices and the lifting cables prior to the buoyancy lift, tension indicating means, means associated with said hydraulically controlled gripping devices for transmitting to said tension indicating means the tension exerted on each cable, and means for actuating said devices and relieving their frictional grip on the cables when it is desired to slip the same.

10. Apparatus for raising sunken vessels by means of submersible pontoons comprising submersible pontoons, a multiplicity of lifting cables associated with said pontoons, a superstructure carried by each pontoon and participating in its movements, a control station on said superstructure from which the various operations of the pontoon can be regulated, the height of the said superstructure being such that the control station is always above water irrespective of the depth to which the pontoon by which it is carried is submerged so that the disposition and position of the vessel which is being raised is indicated during the buoyancy lift both by the inclination to the vertical of the said superstructure and by its depth of immersion.

11. Apparatus for raising sunken vessels comprising submersible pontoons, lifting cables associated with said pontoons, a superstructure carried by each pontoon, a control station on said superstructure and participating in its movements, the height of said superstructure being such that the control station which it carries is always above water irrespective of the depth to which the pontoon by which it is carried is submerged, means for indicating in said control station the tension exerted by the sunken vessel during the buoyancy lift on the respective lifting cables of each pontoon, gripping means for gripping and holding said lifting cables and means coöperating with said gripping means and actuated from said control station for slipping or relieving from tension any cable which is being subjected during the buoyancy lift to more than its due proportion of the load.

In witness whereof we hereunto affix our signatures.

THOMAS GEORGE OWENS THURSTON.
ALFRED HILEY.